(12) United States Patent
Li et al.

(10) Patent No.: US 11,490,078 B2
(45) Date of Patent: Nov. 1, 2022

(54) METHOD AND APPARATUS FOR DEEP NEURAL NETWORK BASED INTER-FRAME PREDICTION IN VIDEO CODING

(71) Applicant: TENCENT AMERICA LLC, Palo Alto, CA (US)

(72) Inventors: Zeqiang Li, Palo Alto, CA (US); Byeongdoo Choi, Palo Alto, CA (US); Wei Wang, Palo Alto, CA (US); Wei Jiang, Sunnyvale, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/476,928

(22) Filed: Sep. 16, 2021

(65) Prior Publication Data
US 2022/0210402 A1    Jun. 30, 2022

Related U.S. Application Data

(60) Provisional application No. 63/131,625, filed on Dec. 29, 2020.

(51) Int. Cl.
*G06N 3/04*        (2006.01)
*H04N 19/50*       (2014.01)
(Continued)

(52) U.S. Cl.
CPC ......... *H04N 19/105* (2014.11); *G06N 3/0454* (2013.01); *H04N 19/172* (2014.11); *H04N 19/182* (2014.11); *H04N 19/50* (2014.11)

(58) Field of Classification Search
CPC .. H04N 19/105; H04N 19/172; H04N 19/182; H04N 19/50; G06N 3/045
See application file for complete search history.

(56) References Cited

U.S. PATENT DOCUMENTS

2006/0133688 A1    6/2006   Kang et al.
2006/0215934 A1    9/2006   Peleg et al.
(Continued)

OTHER PUBLICATIONS

International Search Report dated Dec. 20, 2021 in International Application No. PCT/US2021/051961.
(Continued)

*Primary Examiner* — Anner N Holder
(74) *Attorney, Agent, or Firm* — Sughrue Mion, PLLC

(57) ABSTRACT

Video coding using neural network based inter-frame prediction is performed by generating a current reference frame by generating intermediate flows based on two input frames, performing backward warping of the input frames to generate reconstruction frames, and generating a fusion map and a residual map based on the input frames, the intermediate flows and the reconstruction frames. The video coding method further includes outputting an enhanced frame or a virtual reference picture by generating a feature map with different levels, based on the current reference frame, a first reference frame and a second reference frame, generating a predicted frame based on aligned features from the generated feature map by refining the current reference frame, the first reference frame, and the second reference frame, generating a final residual based on the predicted frame, and computing the enhanced frame as an output by adding the final residual to the current reference frame.

20 Claims, 11 Drawing Sheets

(51) Int. Cl.
    *H04N 19/105*     (2014.01)
    *H04N 19/172*     (2014.01)
    *H04N 19/182*     (2014.01)

(56) References Cited

U.S. PATENT DOCUMENTS

| | | |
|---|---|---|
| 2007/0005808 A1 | 1/2007 | Day |
| 2011/0058747 A1 | 3/2011 | Nakagomi |
| 2018/0249158 A1 | 8/2018 | Huang et al. |
| 2019/0045168 A1* | 2/2019 | Chaudhuri ............... G06T 7/55 |
| 2019/0246102 A1* | 8/2019 | Cho .................... H04N 19/109 |

OTHER PUBLICATIONS

Written Opinion of the International Searching Authority dated Dec. 20, 2021 in International Application No. PCT/US2021/051961.
Jung-Kyung Lee et al., "Deep Video Prediction Network-Based Inter-Frame Coding in HEVC", IEEE Access, 2020, Retrieved from: URL: <https://ieeexplore.IEEE.org/abstract/document/9090881> (12 pages total).

\* cited by examiner

METHOD AND APPARATUS FOR DEEP NEURAL NETWORK BASED INTER-FRAME PREDICTION IN VIDEO CODING

CROSS-REFERENCE TO RELATED APPLICATION

This application is based on and claims priority to U.S. Provisional Patent Application No. 63/131,625, filed on Dec. 29, 2020, the disclosure of which is incorporated by reference herein in its entirety.

BACKGROUND

Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

Traditional video coding standards, such as the H.264/Advanced Video Coding (H.264/AVC), High-Efficiency Video Coding (HEVC) and Versatile Video Coding (VVC) share a similar (recursive) block-based hybrid prediction/transform framework where individual coding tools like the intra/inter prediction, integer transforms, and context-adaptive entropy coding, are intensively handcrafted to optimize the overall efficiency.

SUMMARY

According to embodiments, a method of video coding using neural network based inter-frame prediction is performed by at least one processor and includes generating intermediate flows based on input frames, generating reconstruction frames by performing backward warping of the input frames with the intermediate flows, generating a fusion map and a residual map, based on the input frames, the intermediate flows, and the reconstruction frames, generating a feature map with a plurality of levels using a first neural network, based on a current reference frame, a first reference frame and a second reference frame, generating a predicted frame based on aligned features from the generated feature map by refining the current reference frame, the first reference frame and the second reference frame, generating a final residual based on the predicted frame, and computing an enhanced frame as an output by adding the final residual to the current reference frame.

According to embodiments, an apparatus for video coding using neural network based inter-frame prediction including at least one memory configured to store program code and at least one processor configured to read the program code and operate as instructed by the program code. The program code including first generating code configured to cause the at least one processor to generate intermediate flows based on input frames, second generating code configured to cause the at least one processor to perform backward warping of the input frames with the intermediate flows to generate reconstruction frames, fusion code configured to cause the at least one processor to generate a fusion map and a residual map, based on the input frames, the intermediate flows and the reconstruction frames, third generating code configured to cause the at least one processor to generate a feature map with a plurality of levels using a first neural network, based on a current reference frame, a first reference frame and a second reference frame, predicting code configured to cause the at least one processor to predict a frame based on aligned features from the generated feature map by refining the current reference frame, the first reference frame and the second reference frame, residual code configured to cause the at least one processor to generate a final residual based on the predicted frame, and fourth generating code configured to cause the at least one processor to generate an enhanced frame as an output by adding the final residual to the current reference frame.

According to embodiments, a non-transitory computer-readable medium storing instructions that, when executed by at least one processor for video coding using neural network based inter-frame prediction, cause the at least one processor to generate intermediate flows based on input frames, perform backward warping of the input frames with the intermediate flows to generate reconstruction frames, generate a fusion map and a residual map based on the input frames, the intermediate flows and the reconstruction frames, generate a feature map with a plurality of levels using a first neural network, based on a current reference frame, a first reference frame and a second reference frame, predict a frame based on aligned features from the generated feature map by refining the current reference frame, the first reference frame and the second reference frame, generate a final residual based on the predicted frame, and generate an enhanced frame as an output by adding the final residual to the current reference frame.

DETAILED DESCRIPTION

This disclosure describes a Deep Neural Network (DNN)-based model relating to video coding and decoding. More specifically, a (DNN)-based model that uses and generates virtual reference data from adjacent reference frames for inter-frame prediction as a Video Frame Interpolation (VFI) task and a detail enhancement module to further improve the frame's quality and reduce artifacts (such as noises, blur, blocky effects, etc.) on motion boundaries.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques in which an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Basically, the Spatiotemporal pixel neighborhoods are leveraged for predictive signal construction, to obtain corresponding residuals for subsequent transform, quantization, and entropy coding. On the other hand, the nature of Deep Neural Networks (DNN) is to extract different levels of spatiotemporal stimuli by analyzing spatiotemporal information from the receptive field of neighboring pixels. The capability of exploring highly nonlinearity and nonlocal spatiotemporal correlations provide promising opportunity for largely improved compression quality.

One caveat of leveraging information from multiple neighboring video frames is the complex motion caused by moving camera and dynamic scenes. Traditional block-based motion vectors cannot work well for non-translational motions. Learning based optical flow methods can provide accurate motion information at pixel-level, which is, unfortunately prone to error, especially along the boundary of moving objects. This disclosure proposes to using a DNN-based model to implicitly handle arbitrary complex motion in a data-driven fashion, without explicit motion estimation.

Figure 1:
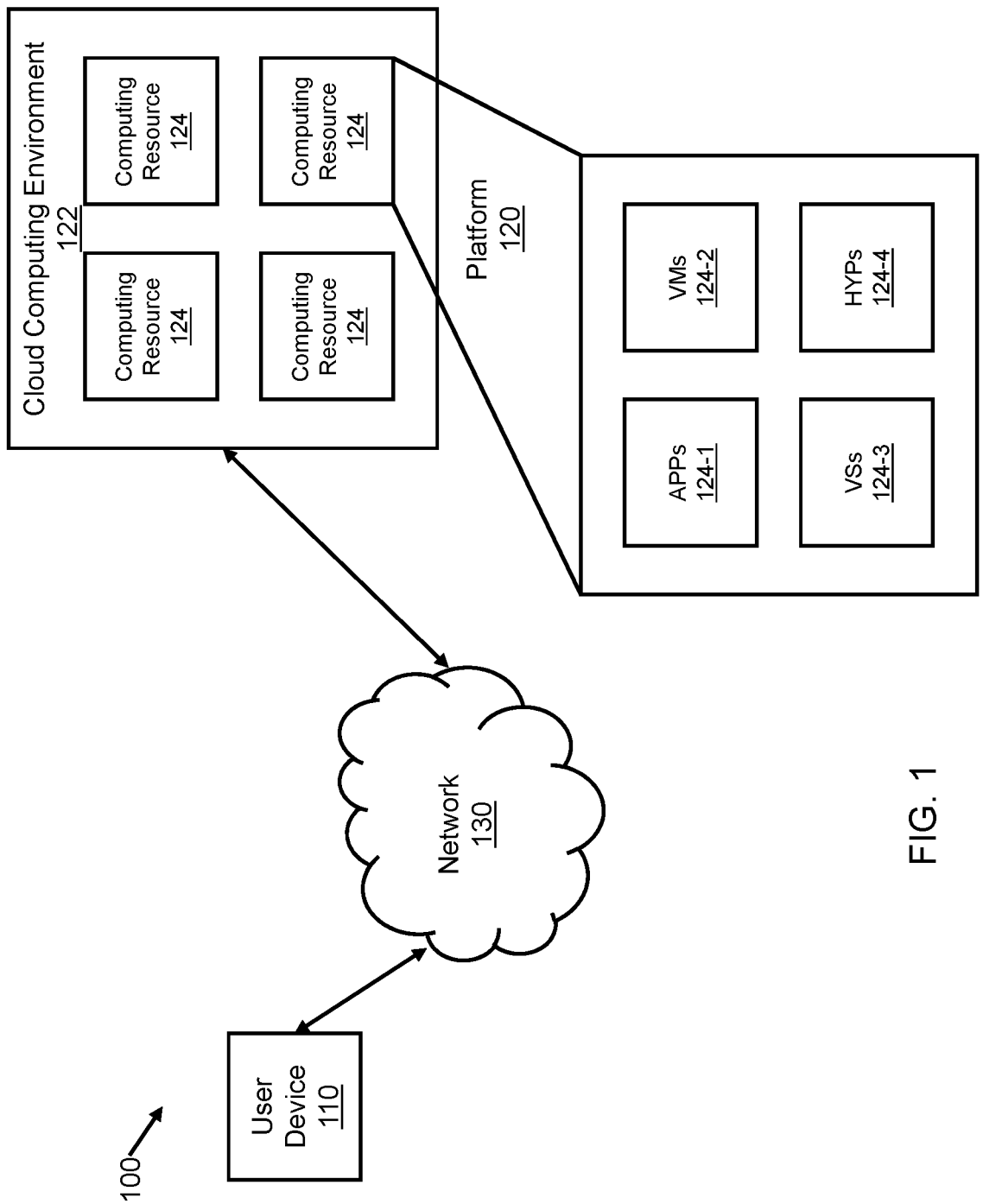
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
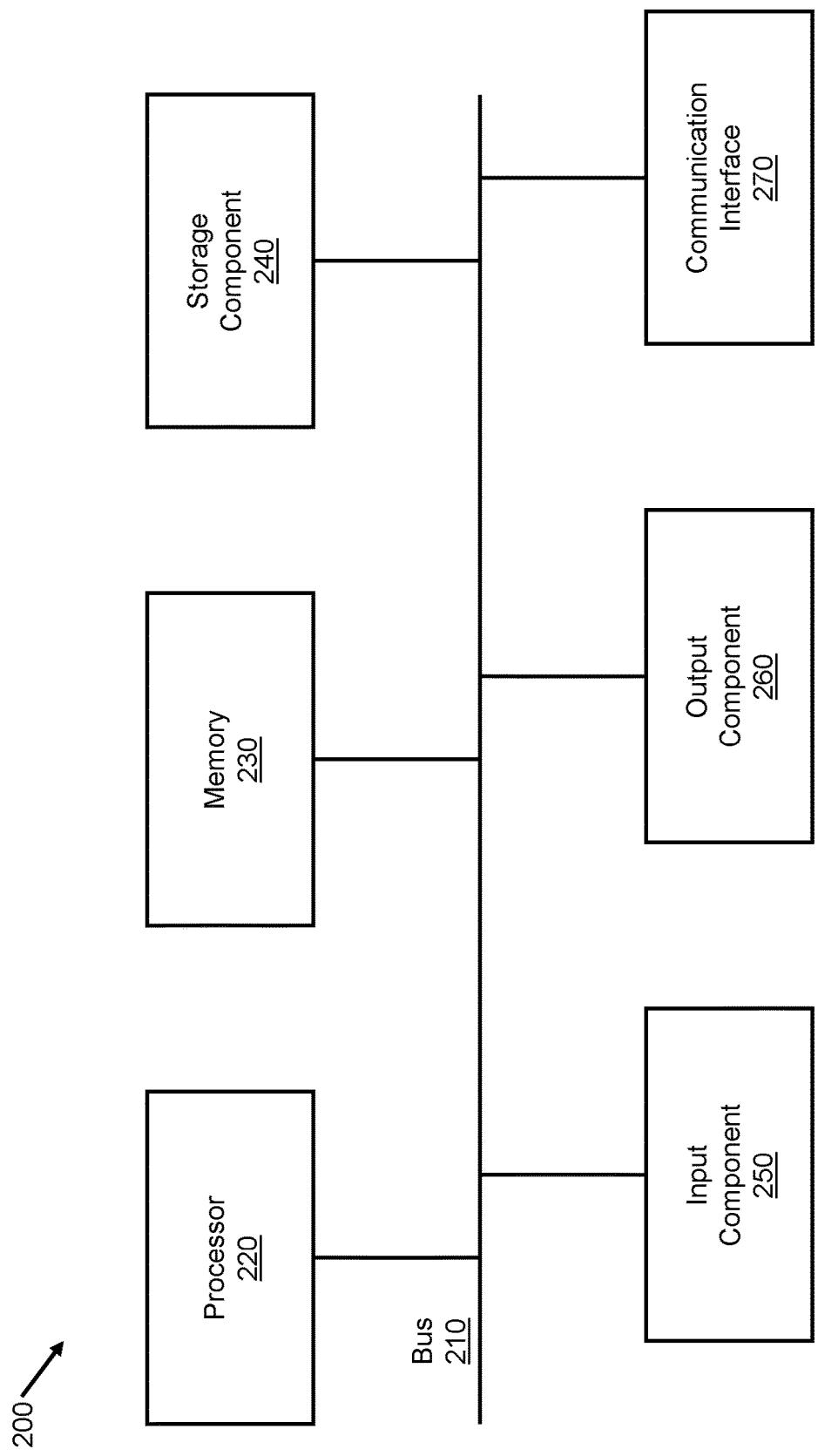
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A typical video compression framework can be described as follows. Given an input video x including a plurality of image frames $x_1, \ldots, x_T$, in the first motion estimation step, the frames are partitioned into spatial blocks. Each block can be partitioned into smaller blocks iteratively and a set of motion vectors $m_t$ between a current frame $x_t$ and a set of previous reconstructed frames $\{\hat{x}_j\}_{t-1}$ is computed for each block. Note that the subscript t denotes the current t-th encoding cycle, which may not match the time stamp of the image frame. Also, the set of previous reconstructed frames $\{\hat{x}_j\}_{t-1}$ contain frames from multiple previous encoding cycles. Then, in the second motion compensation step, a predicted frame $\tilde{x}_t$ is obtained by copying the corresponding pixels of the set of previous reconstructed frames $\{\hat{x}_j\}_{t-1}$ based on the motion vectors $m_t$, and a residual $r_t$ between the original frame $x_t$ and the predicted frame $\tilde{x}_t$ can be obtained (i.e. $r_t = x_t - \tilde{x}_t$). In the third motion compensation step, the residual $r_t$ is quantized. The quantization step gives a quantized $\hat{y}_t$. Both the motion vectors $m_t$ and the quantized $\hat{y}_t$ are encoded into bit steams by entropy coding, which are sent to decoders. Then, on the decoder side, the quantized $\hat{y}_t$ is dequantized (typically through inverse transformation like IDCT with the dequantized coefficients) to obtain a recovered residual $\hat{r}_t$. Then the recovered residual $\hat{r}_t$ is added back to the predicted frame $\tilde{x}_t$ to obtain a reconstructed frame $\hat{x}_t$ (i.e. $\hat{x}_t = \tilde{x}_t + \hat{r}_t$). Additional components are further used to improve the visual quality of the reconstructed frame $\hat{x}_t$. Typically, one or multiple of the following enhancement modules can be selected to process the reconstructed frame $\hat{x}_t$, including Deblocking Filter (DF), Sample-Adaptive Offset (SAO), Adaptive Loop Filter (ALF), etc.

In HEVC, VVC or other video coding frameworks or standards, the decoded pictures may be included in the reference picture list (RPL) and may be used for motion-compensated prediction as a reference picture and other parameter prediction for coding the following picture(s) in the encoding or decoding order or may be used for intra-prediction or intra block copy for coding different regions or blocks of the current picture.

In embodiments, one or more virtual references may be generated and included in the RPL in both the encoder and decoder, or only in the decoder. The virtual reference picture may be generated by one or more processes including signal-processing, spatial or temporal filtering, scaling, weighted averaging, up-/down-sampling, pooling, recursive processing with memory, linear system processing, non-linear system processing, neural-network processing, deep-learning based processing, AI-processing, pre-trained network processing, machine-learning based processing, on-line training network processing or their combinations. For the processing to generate the virtual reference(s), zero or more forward reference pictures, which precede the current picture in both output/display order and encoding/decoding order, and zero or more backward reference pictures, which follow the current picture both in output/display order but precede the current picture in encoding/decoding order are used as input data. The output of the processing is the virtual/generated picture to be used as a new reference picture.

Figure 3:
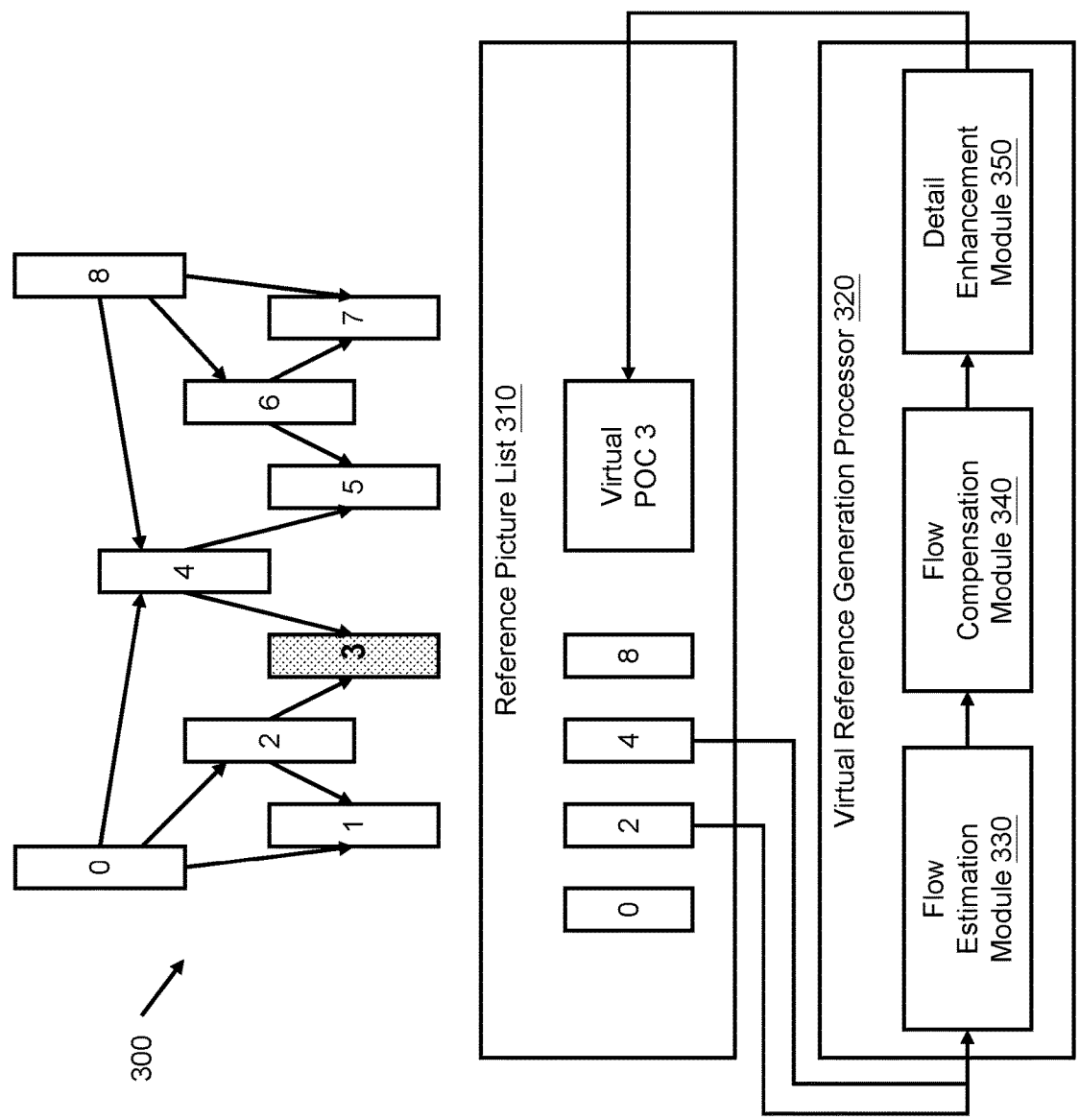
FIG. 3 is a schematic of an example of virtual reference picture generation and insertion into a reference picture list.

A DNN pre-trained network processing for virtual reference picture generation is described according to embodiments. FIG. 3 illustrates an example of virtual reference picture generation and insertion into a reference picture list including a hierarchical GOP structure 300, a reference picture list 310, and a virtual reference generation process 320.

As shown in FIG. 3, given the hierarchical GOP structure 300, when the current picture has a picture order count (POC) equal to 3, usually, the decoded picture with POC equal to 0, 2, 4 or 8 may be stored in a decoded picture buffer and some of them are included in the reference picture list for decoding the current picture. As an example, the nearest decoded pictures with POC equal to 2 or 4 may be fed into the virtual reference generation process 320 as input data. The virtual reference picture may be generated through one or multiple processes. The generated virtual reference picture may be stored in the decoded picture buffer and included into the reference picture list 310 of the current picture or one or more future pictures in decoding order. If the virtual reference picture is included into the reference picture list 310 of the current picture, the generated pixel data of the virtual reference picture may be used for motion compensated prediction as reference data, when it is indicated by a reference index that the virtual reference picture is used.

In the same or another embodiment, the entire virtual reference generation process may include one of more signaling processing modules with one or more pre-trained neural network model or any pre-defined parameters. For example, the entire virtual reference generation process 320 may be composed of a flow estimation module 330, a flow compensation module 340, and a detail enhancement module 350, as shown in FIG. 3. The flow estimation module 330 may be an optical feature flow estimation process with DNN modeling. The flow compensation module 340 may be an optical flow compensation and coarse intermediate frame synthesizing process with DNN modeling. The detail enhancement module 350 may be an enhancing process with DNN modeling.

A method and an apparatus of a DNN model for Video Frame Interpolation (VFI) according to embodiments will now be described in detail.

Figure 4:
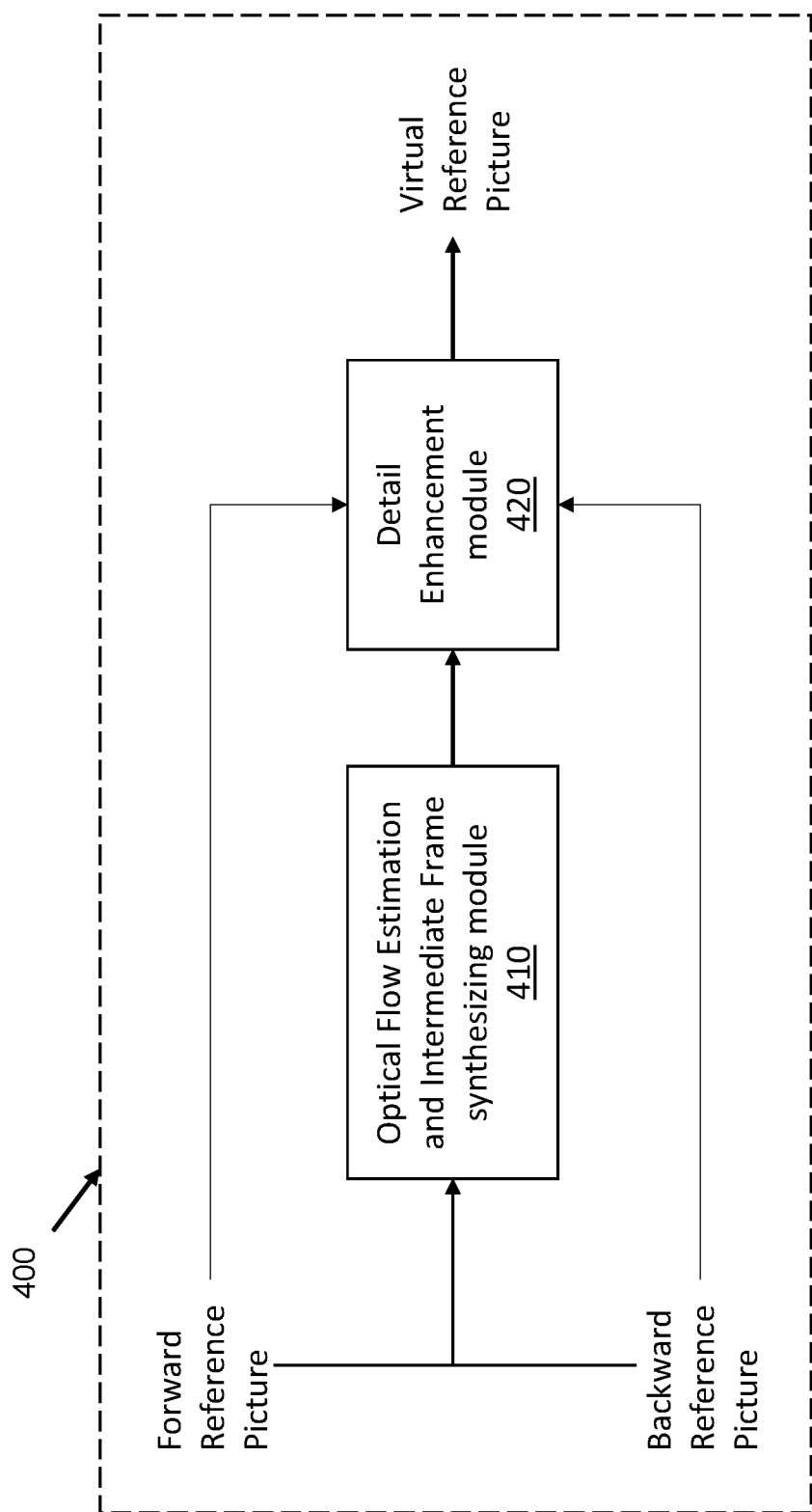
FIG. 4 is a block diagram of a test apparatus of a virtual reference generation process, during a test stage, according to embodiments.

FIG. 4 is a block diagram of a test apparatus for a virtual reference generation process 400, during a test stage, according to embodiments.

As shown in FIG. 4, the virtual reference generation process 400 includes an Optical Flow Estimation and Intermediate Frame synthesizing module 410 and a Detail Enhancement module 420.

In a random access configuration of a VVC decoder, two reference frames are fed into the Optical Flow Estimation and Intermediate Frame synthesizing module 410 to generate flow maps and then generate a coarse intermediate frame to be fed into the detail enhancement module 420 along with the forward/backward reference frame to further improve the frame's quality. A more detailed description of the DNN modules, the Optical Flow Estimation and Intermediate Frame Synthesizing module 410 and the Detail Enhancement module 420, used to perform the reference frame generation process will be detailed later with reference to FIG. 5 and FIG. 6, respectively.

Depending on the prediction structure and/or encoding configuration, two or more different models may be trained and used, selectively. In the random access configuration, which may use hierarchical prediction structure with both forward and backward prediction reference pictures for motion compensated prediction, one or more forward reference picture that precedes the current picture in output (or display) order and one or more backward reference picture that follows the current picture in output (or display) order are the inputs of the network. In the low delay configuration, which may have forward prediction reference pictures only for motion compensated prediction, two or more forward reference pictures are the inputs of the network. For each configuration, one or more different network models may be selected and used for inter-prediction.

Once one or more reference picture lists (RPLs) are constructed before the network inference is processed, the presence of the appropriate reference pictures that may be used as inputs of the network inference is checked in both encoder and decoder. If a backward reference picture that has the same POC distance from the current picture as the POC distance of a forward reference picture is present, the trained models for random access configuration may be selected and used in network inference to generate the intermediate (virtual) reference picture. If an appropriate backward reference picture is not present, two forward reference pictures, one of which has a POC distance that is double the other, may be selected and used in network inference.

When the network model for inter-prediction explicitly uses an encoding configuration, one or more syntax elements in a high level syntax structure, such as parameter sets or headers, may indicate which models are used for the current sequence, picture, or slice. In an embodiment, all available network models in the current coded video sequence are listed in a sequence parameter set (SPS), and the selected model for each coded picture or slice is indicated by one or more syntax elements in a picture parameter set (PPS) or picture/slice header.

The network topology and parameters may be explicitly specified in the specification document of video coding standards, such as VVC, HEVC or AV1. In this case, the predefined network model may be used for the entire coded video sequence. If two or more network models are defined in the specification, one or more of them may be selected for each coded video sequence, coded picture or slice.

In a case where the customized network is used for each coded video sequence, picture or slice, the network topology and parameters may be explicitly signaled in the high level syntax structure, such as a parameter set or SEI message in an elementary bitstream, or in a metadata track in the file format. In an embodiment, one or more network models with network topologies and parameters are specified in one or more SEI messages, where those SEI messages may be inserted into the coded video sequence with different activation scopes. Further, the following SEI message in the coded video bitstream may update the previously activated SEI message.

Figure 5:
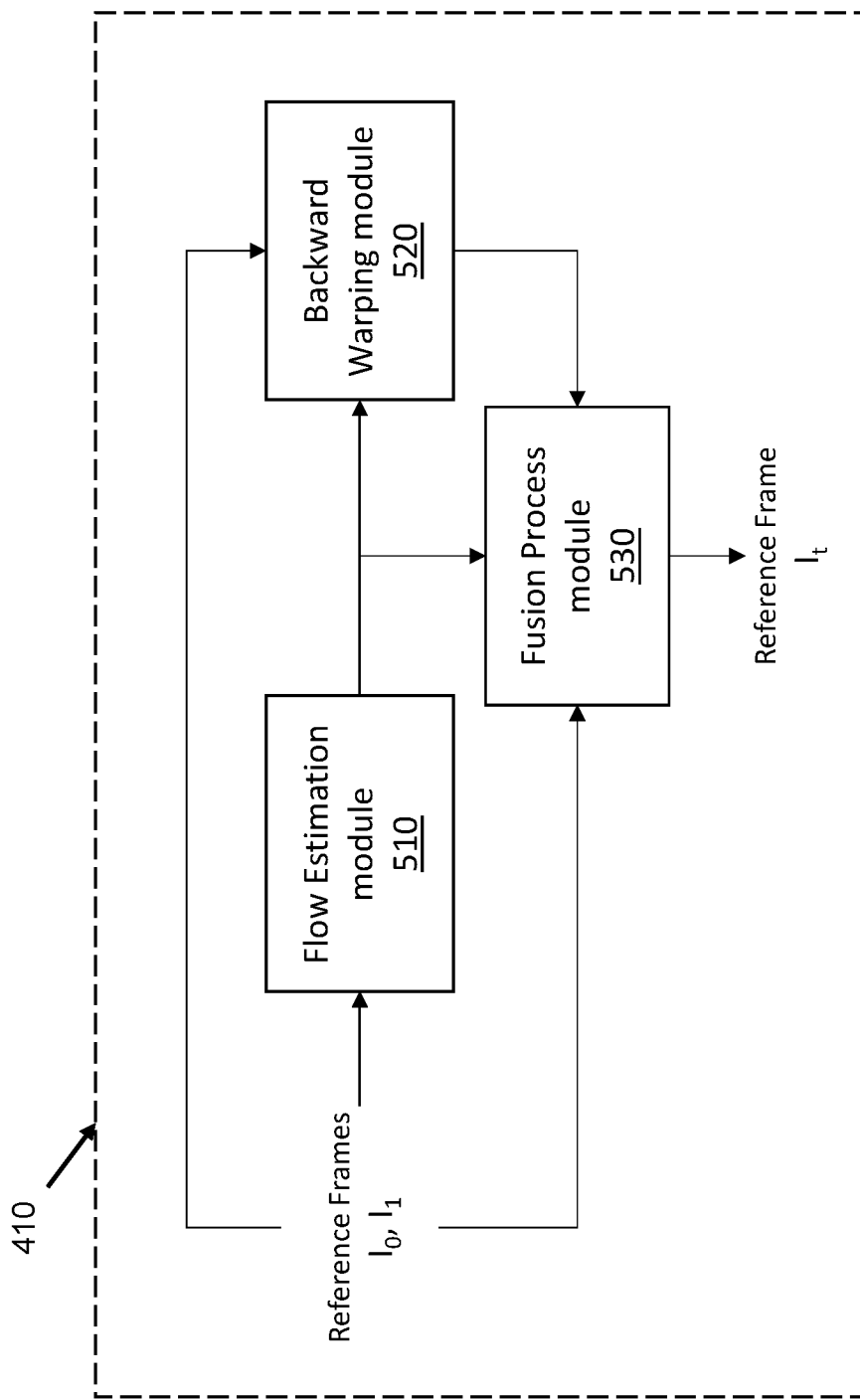
FIG. 5 is a detailed block diagram of an Optical Flow Estimation and Intermediate frame synthesizing module from the test apparatus of FIG. 4, during a test stage, according to embodiments.

FIG. 5 is a detailed block diagram of the Optical Flow Estimation and Intermediate Frame Synthesizing module 410, during a test stage, according to embodiments.

As shown in FIG. 5, the Optical Flow Estimation and Intermediate Frame Synthesizing module 410 includes a Flow Estimation module 510, a Backward Warping module 520, and a Fusion Process module 530.

Two reference frames $\{I_0, I_1\}$ are used as input to the Flow Estimation module 510 which approximates the intermediate flows $\{F_{0 \to t}, F_{1 \to t}\}$ from the perspective of the frame $I_t$ that is expected to be synthesized. The Flow Estimation module 510 adopts a coarse-to-fine strategy with progressively increased resolutions: it iteratively updates a flow field. Conceptually, according to the iteratively updated flow fields, corresponding pixels are moved from two input frames to the same location in a latent intermediate frame.

With the estimated intermediate flows $\{F_{0 \to t}, F_{1 \to t}\}$, the Backward Warping module 520 generates coarse reconstruction frames or warped frames $\{I_{0 \to t}, I_{1 \to t}\}$ by performing backward warping on the input frames $\{I_0, I_1\}$. Backward warping of the frames may be performed by inversely mapping and sampling pixels of the latent intermediate frame to the input frames $\{I_0, I_1\}$ to generate the warped frames $\{I_{0 \to t}, I_{1 \to t}\}$. The Fusion Process module 530 takes the input frames $\{I_0, I_1\}$, the warped frames $\{I_{0 \to t}, I_{1 \to t}\}$, and the estimated intermediate flows $\{F_{0 \to t}, F_{1 \to t}\}$ as inputs. The Fusion Process module 530 estimates a fusion map along with another residual map. The fusion map and residual map are estimated maps that map feature variations in the input. Then, the warped frames are linearly combined according to the fusion result and added with the residual map to do reconstruction to get an intermediate frame (referred to as Reference Frame $I_t$ in FIG. 5).

Figure 6:
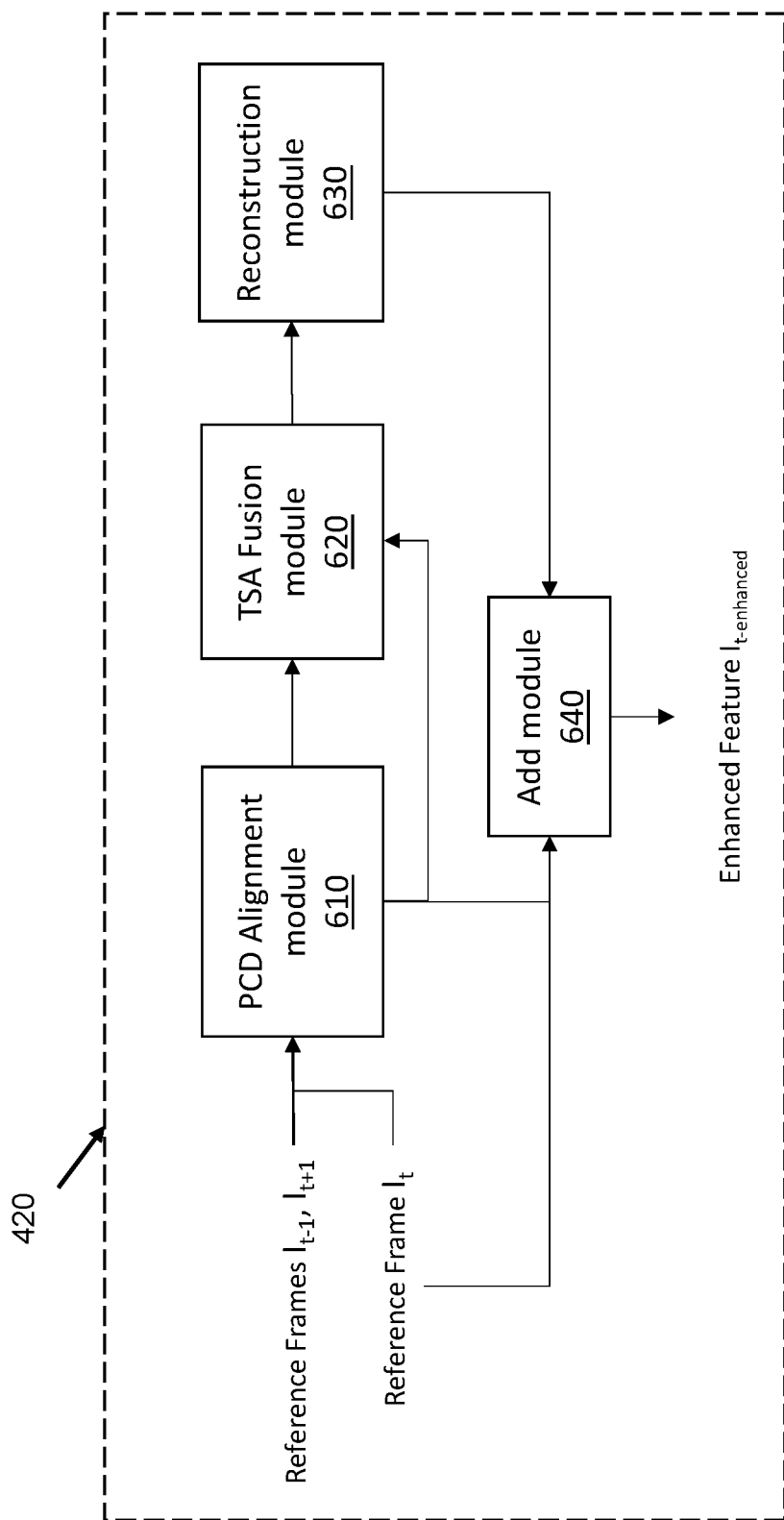
FIG. 6 is a detailed block diagram of a Detail Enhancement module from the test apparatus of FIG. 4, during a test stage, according to embodiments.

FIG. 6 is a detailed block diagram of the Detail Enhancement module 420, during a test stage, according to embodiments.

As shown in FIG. 6, the Detailed Enhancement module 420 includes a PCD Alignment module 610, a TSA Fusion module 620, and a Reconstruction module 630.

Assuming that reference frame $I_t$ is a reference that all other frames will be aligned to using and two reference frames $\{I_{t-1}, I_{t+1}\}$ together as input, the PCD (Pyramid, Cascading and Deformable convolution) alignment module 610 refines the reference frame's $(I_{t-1}, I_t, I_{t+1})$ features as an aligned feature $F_{t\text{-}aligned}$. Using the aligned feature $F_{t\text{-}aligned}$, the TSA (Temporal and Spatial Attention) Fusion module 620 provides the weight of the feature map to apply attention to emphasize important features for subsequent restoration and outputs a predicted frame $I_p$. A more detailed description of the PCD Alignment module 610 and the TSA Fusion module 620 will be detailed later with reference to FIG. 7 and FIG. 8, respectively.

Then, the Reconstruction module formats a final residual of the reference frame $I_t$ based on the predicted frame $I_p$. Finally, the Add module 640 adds the formatted final residual to the reference frame $I_t$ to get an enhanced frame $I_{t\text{-}enhanced}$ as a final output of the Detailed Enhancement module 420.

Figure 7:
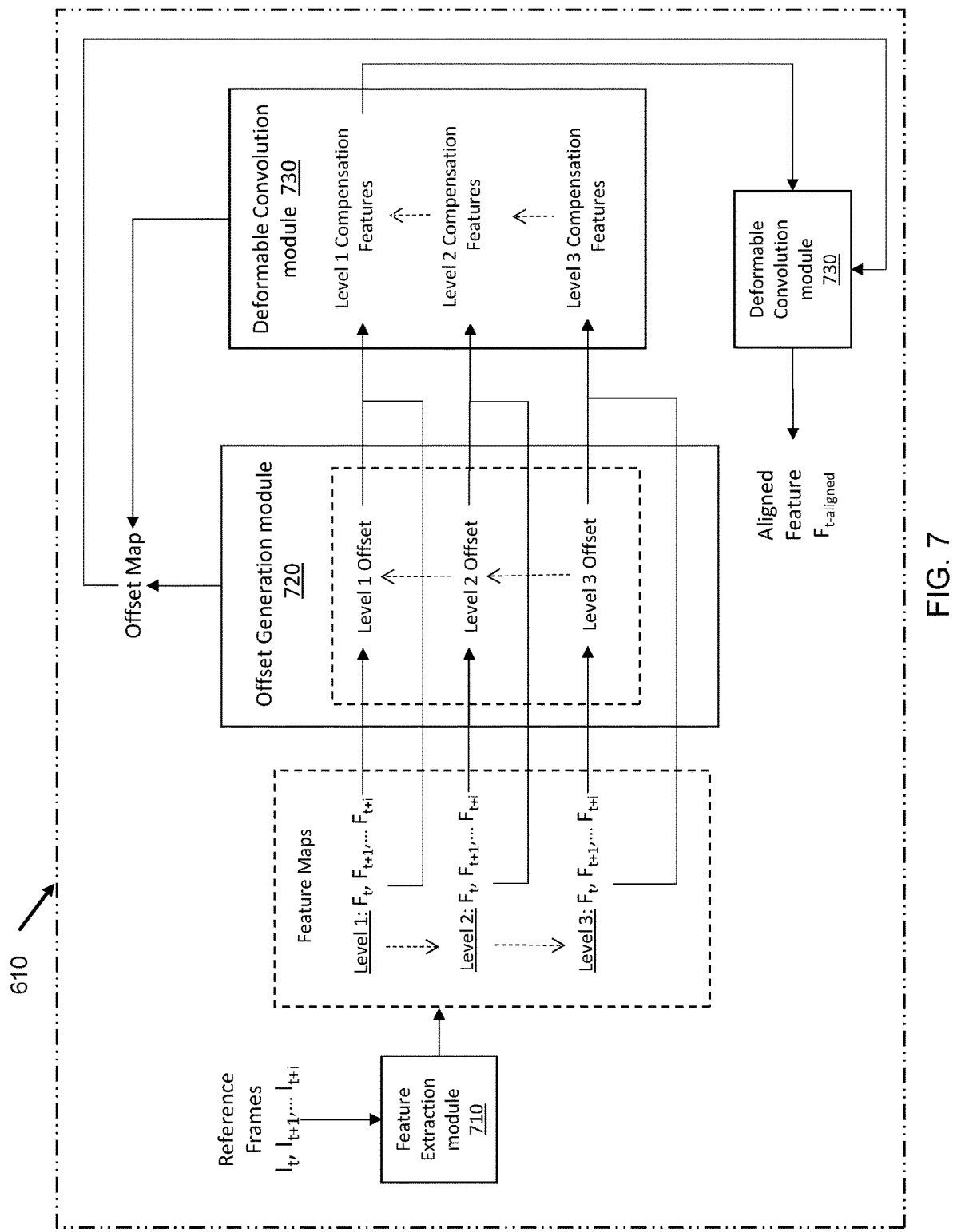
FIG. 7 is a detailed block diagram of a PCD Alignment module, during a test stage, according to embodiments.

FIG. 7 is a detailed block diagram of the PCD Alignment module 610 inside the Detailed Enhancement module 420, during a test stage, according to embodiments. Modules in FIG. 7 having the same name and numbering convention may be the same or one of a plurality of modules performing the described functions (e.g. Deformable Convolution module 730).

As shown in FIG. 7, the PCD Alignment module 610 includes a Feature Extraction module 710, an Offset Generation module 720, and a Deformable Convolution module 730. The PCD Alignment module 610 computes the aligned features $F_{t\text{-}aligned}$ of the inter-frame.

First, using each reference frame in $\{I_0, I_1 \ldots I_t, I_{t+1} \ldots\}$ as input, the Feature Extraction module 710 computes a feature map $\{F_0, F_1 \ldots F_t, F_{t+1} \ldots\}$ with three different levels by using a Feature Extraction DNN through forward inference. The different levels have different resolutions for feature compensation to capture different levels of spatial/temporal information. For example, with larger motion in the sequence, the smaller feature map will be able to have a larger respective field and be able to handle a variety of object offset.

With different level feature maps, an Offset Generation module 720 computes an offset map $\Delta P$ by concatenating the feature maps $\{F_t, F_{t+1}\}$ and then passing the concatenated feature maps through an offset generation DNN. Then, the Deformable Convolution module 730 calculates a new position of a DNN convolution kernel $P_{new}$ by adding the offset map $\Delta P$ to an original position $P_{original}$ (i.e. $\Delta P+P_{original}$) using a Temporal Deformable Convolution (TDC) operation. Note that the reference frame $I_t$ can be any frame within $\{I_0, I_1 \ldots I_t, I_{t+1} \ldots \}$. Without loss of generality, frames may be ranked based on their time stamp in accenting order. In one embodiment, when the current target is to enhance a current reconstructed frame $I'_t$, the reference frame $I_t$ is used as the intermediate frame.

Since the new position $P_{new}$ may be an irregular position and may not be an integer, the TDC operation can be conducted by using interpolations (e.g., bilinear interpolation). By applying deformable convolution kernel in the Deformable Convolution module 730, compensation features from different levels can be generated based on the feature map of the level and the corresponding generated offsets. Deformable convolution kernel may then be applied to obtain the top-level aligned feature $F_{t-aligned}$ based on the offset map $\Delta P$ and one or more of the compensation features, by up-sampling and adding to the upper-level compensation feature.

Figure 8:
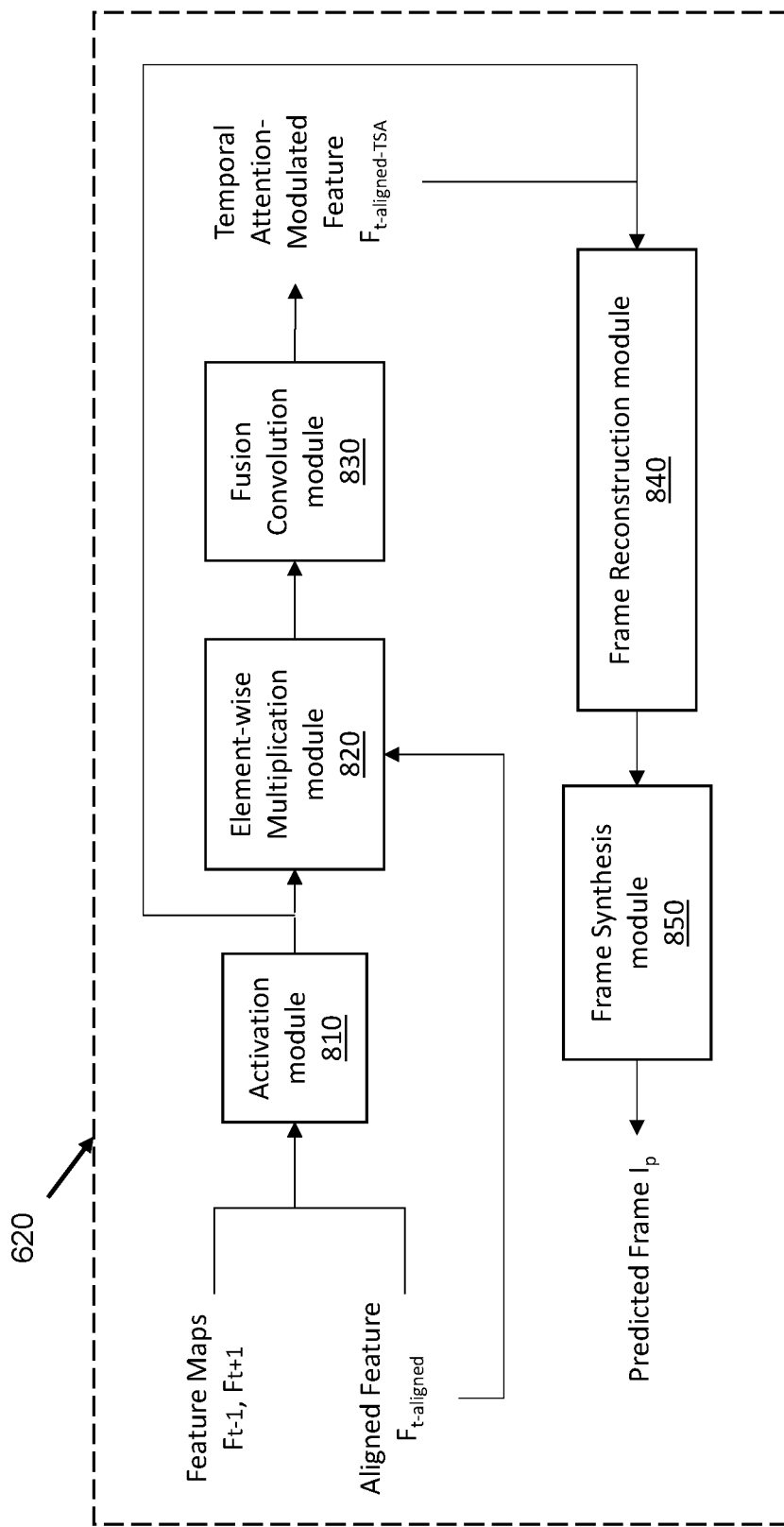
FIG. 8 is a detailed block diagram of a TSA Fusion module, during a test stage, according to embodiments.

FIG. 8 is a detailed block diagram of the TSA Fusion module 620 inside the Detailed Enhancement module 420, during a test stage, according to embodiments.

As shown in FIG. 8, the TSA Fusion module 620 includes an Activation module 810, an Element-wise Multiplication module 820, a Fusion Convolution module 830, a Frame Reconstruction module 840, and a Frame Synthesis module 850. The TSA Fusion module 620 uses temporal and spatial attention. The goal of temporal attention is to compute frame similarity in an embedding space. Intuitively, in an embedding space, a neighboring frame that is more similar to the reference frame should be paid more attention to. Given the feature maps $\{F_{t-1}, F_{t+1}\}$ and aligned feature $F_{t-aligned}$ of the center frame as input, the Activation module 810 uses a sigmoid activation function to restrict the inputs to [0, 1] as a simple convolution filters to get the temporal attention maps $\{F'_{t-1}, F'_t, F'_{t+1}\}$ as an output of the Activation module 810. Note that for each spatial location, the temporal attention is spatial-specific.

Then, the Element-wise Multiplication module 820 multiplies the temporal attention maps $\{F'_{t-1}, F'_t, F'_{t+1}\}$ in a pixel-wise manner with the aligned feature $F_{t-aligned}$. An extra fusion convolution layer is adopted in the Fusion Convolution module 830 to obtain aggregated attention-modulated features $F_{t-aligned-TSA}$. Using the temporal attention maps $\{F'_{t-1}, F'_t, F'_{t+1}\}$ and the attention-modulated features $F_{t-aligned-TSA}$, the Frame Reconstruction module 840 uses a Frame Reconstruction DNN through feed forward inference computation to generate aligned frames $I_{t-aligned}$. Then, the aligned frames $I_{t-aligned}$ are passed through a Frame Synthesis module 850 to generate the synthesized predicted frame $I_p$ as a final output.

Figure 9:
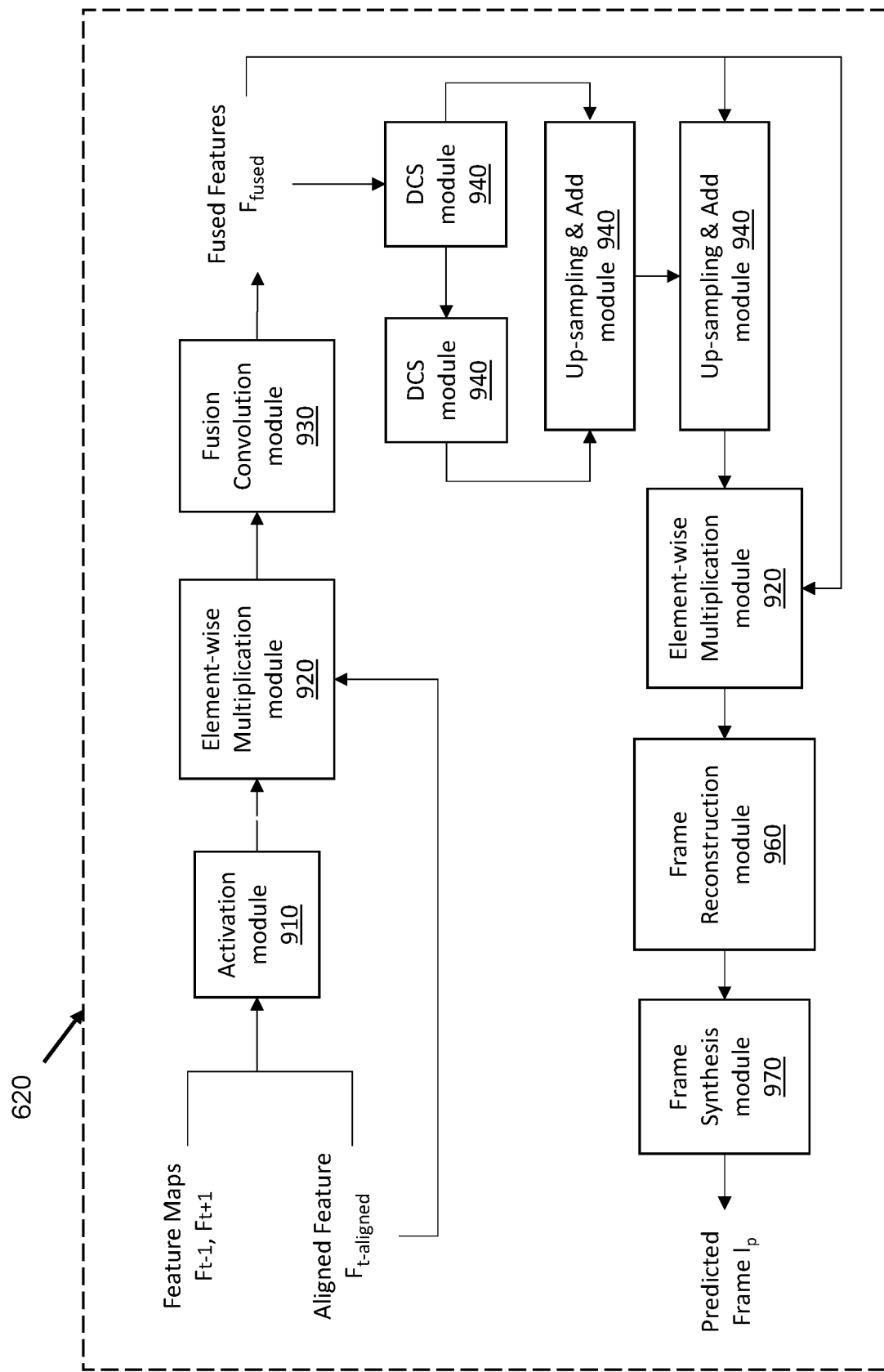
FIG. 9 is a detailed block diagram of the TSA Fusion module, during a test stage, according to another embodiment.

FIG. 9 is a detailed block diagram of the TSA Fusion module 620 inside the Detailed Enhancement module 420, during a test stage, according to another example embodiment. Modules in FIG. 9 having the same name and numbering convention may be the same or one of a plurality of modules performing the described functions.

As shown in FIG. 9, the TSA Fusion module 620 according to this embodiment includes an Activation module 910, an Element-wise Multiplication module 920, a Fusion Convolution module 930, a Down-sampled Convolution (DSC) module 940, an Up-sampling and Add module 950, a Frame Reconstruction module 960, and a Frame Synthesis module 970. Similar to embodiments of FIG. 8, TSA Fusion module 620 uses temporal and spatial attention. Given the feature maps $\{F_{t-1}, F_{t+1}\}$ and aligned feature $F_{t-aligned}$ of frame the center as input, the Activation module 910 uses a sigmoid activation function to restrict the inputs to [0, 1] as a simple convolution filters to get the temporal attention maps $\{M_{t-1}, M_t, M_{t+1}\}$ as an output of the Activation module 910.

Then, the Element-wise Multiplication module 920 multiplies the temporal attention maps $\{M_{t-1}, M_t, M_{t+1}\}$ in a pixel-wise manner with the aligned feature $F_{t-aligned}$. Fusion convolution is performed on the product, in the Fusion Convolution module 930, to generate fused features $F_{fused}$. The fused features $F_{fused}$ are passed down sampled and convolved by the DSC module 940. Another convolution layer may be adopted and processed by the DSC module 940, as shown in FIG. 9. The output from each layer of the DSC module 940 is input to the Up-sampling and Add module 950. An extra layer of the up sampling and adding is be applied along with the fused features $F_{fused}$ as input to the extra layer, as shown in FIG. 9. The Up-sampling and Add modules 950 generate fused attention maps $M_{t-fused}$. The Element-wise Multiplication module 920 multiplies the fused attention maps $M_{t-fused}$ in a pixel-wise manner with the fused features $F_{fused}$ to generate a TSA aligned feature $F_{t-TSA}$. Using the temporal attention maps $\{M_{t-1}, M_t, M_{t+1}\}$ and the TSA aligned feature $F_{t-TSA}$, the Frame Reconstruction module 960 uses a Frame Reconstruction DNN through feed forward inference computation to generate TSA aligned frames $I_{t-TSA}$. Then, the aligned frames $I_{t-TSA}$ are passed through a Frame Synthesis module 970 to generate the synthesized predicted frame $I_p$ as a final output.

Figure 10:
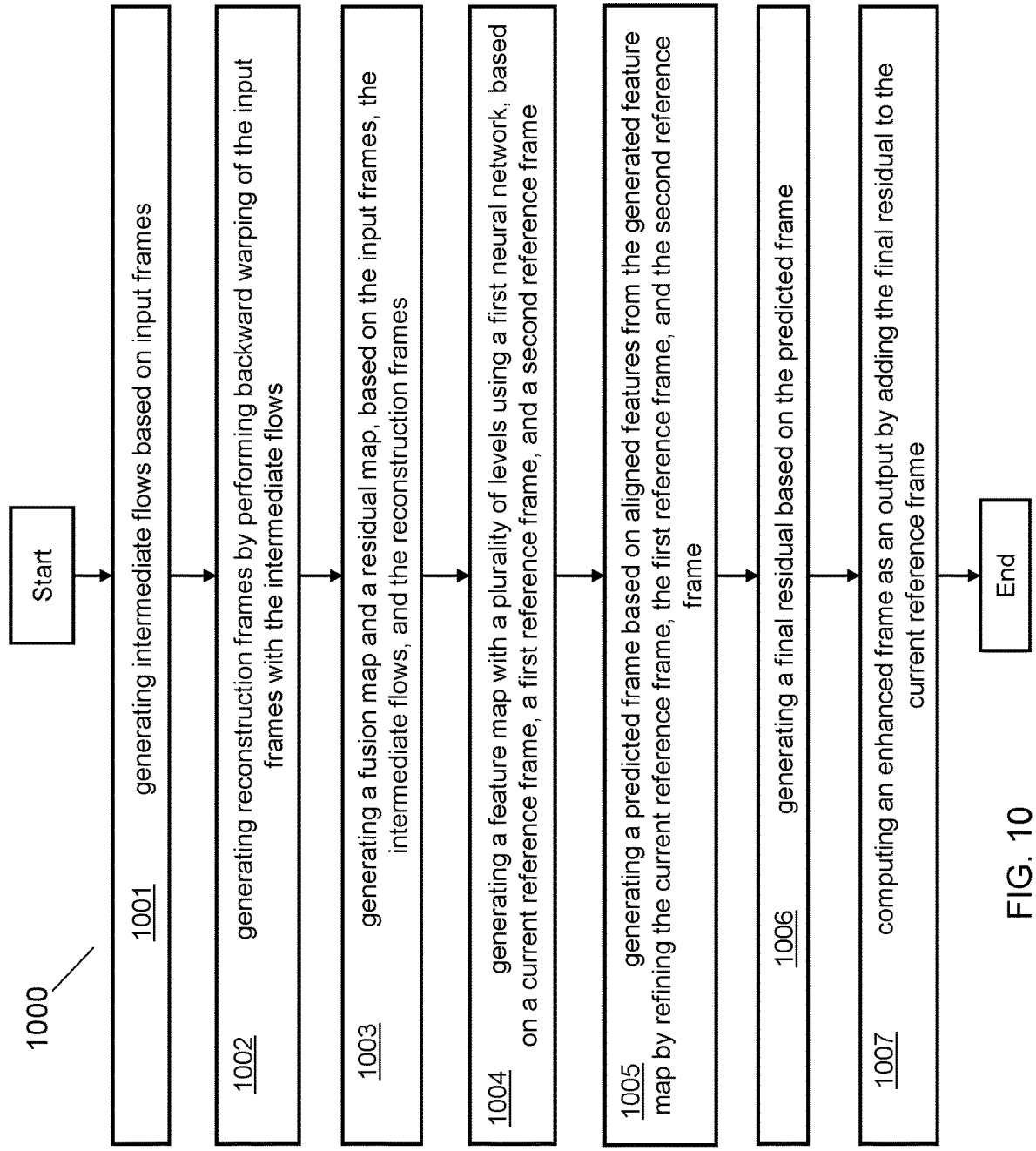
FIG. 10 is a flowchart of a method of video coding using neural network based inter-frame prediction, according to embodiments.

FIG. 10 is a flowchart of a method 1000 of video coding using neural network based inter-frame prediction, according to embodiments.

In some implementations, one or more process blocks of FIG. 10 may be performed by the platform 120. In some implementations, one or more process blocks of FIG. 10 may be performed by another device or a group of devices separate from or including the platform 120, such as the user device 110.

As shown in FIG. 10, in operation 1001, the method 1000 includes generating intermediate flows based on input frames. The intermediate flows may further be iteratively updated and corresponding pixels moved from two input frames to the same location in a latent intermediate frame.

In operation 1002, the method 1000 includes generating reconstruction frames by performing backward warping of the input frames with the intermediate flows.

In operation 1003, the method 1000 includes generating a fusion map and a residual map, based on the input frames, the intermediate flows, and the reconstruction frames.

In operation 1004, the method 1000 includes generating a feature map with a plurality of levels using a first neural network, based on a current reference frame, a first reference frame, and a second reference frame. The current reference frame may be generated by linearly combining the reconstruction frames according to the fusion map and adding the combined reconstruction frames with the residual map. Further, the first reference frame may be a reference frame that precedes the current reference frame in an output order and the second reference frame may be a reference frame that follows the current reference frame in the output order.

In operation 1005, the method 1000 includes generating a predicted frame based on aligned features from the generated feature map by refining the current reference frame, the first reference frame, and the second reference frame. Specifically, the predicted frame may be generated by first performing convolution to obtain attention maps, generating attention features, based on the attention maps and the aligned features, generating an aligned frame, based on the attention maps and the attention features, and then synthesizing the aligned frame to obtain the predicted frame.

The aligned features may be generated by computing an offset for the plurality of levels of the feature map generated in operation 1004 and performing deformable convolution to generate compensation features for the plurality of levels. The aligned features may then be generated based on the offset and at least one of the generated compensation features.

In operation 1006, the method 1000 includes generating a final residual based on the predicted frame. A weight of the feature map, generated in operation 1004, may also be generated, emphasizing important features for generation of subsequent final residuals.

In operation 1007, the method 1000 includes computing an enhanced frame as an output by adding the final residual to the current reference frame.

Although FIG. 10 shows example blocks of the method, in some implementations, the method may include additional blocks, fewer blocks, different blocks, or differently arranged blocks than those depicted in FIG. 10. Additionally, or alternatively, two or more of the blocks of the method may performed in parallel.

Figure 11:
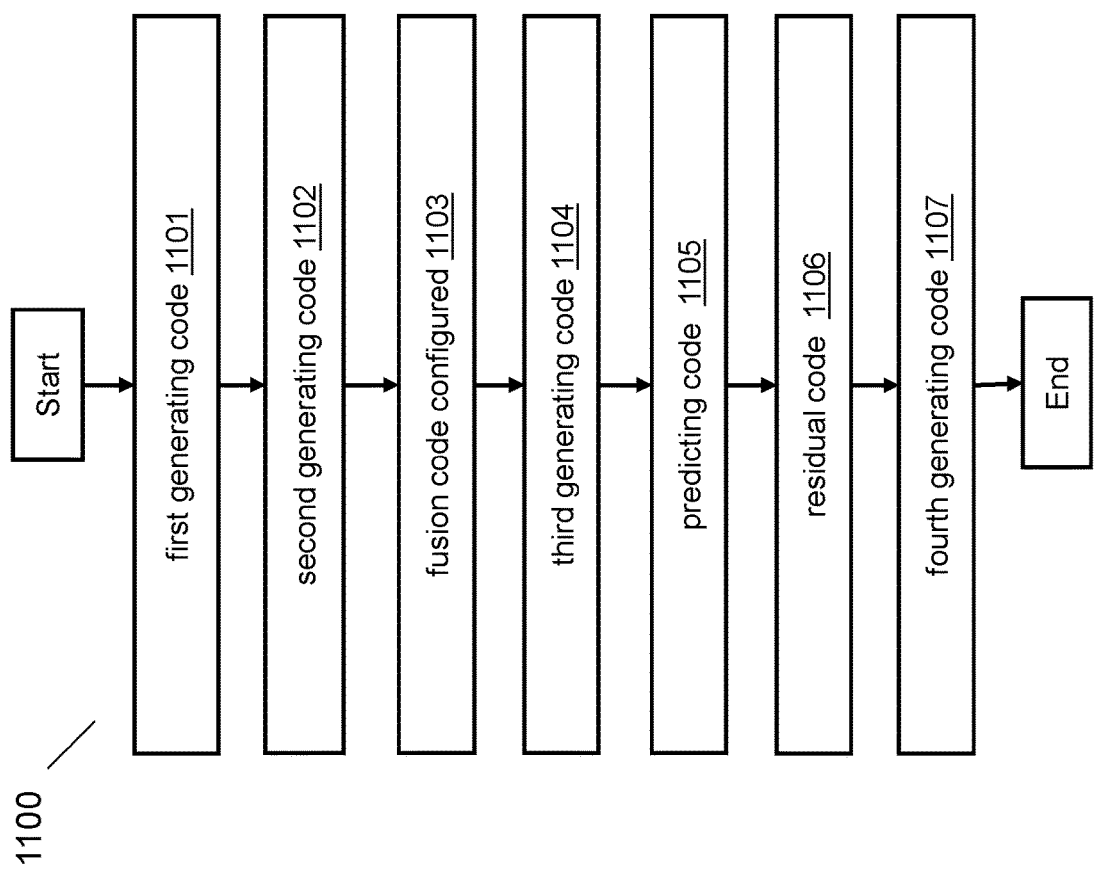
FIG. 11 is a block diagram of an apparatus of video coding using neural network based inter-frame prediction, according to embodiments.

FIG. 11 is a block diagram of an apparatus 1100 of video coding using neural network based inter-frame prediction, according to embodiments.

As shown in FIG. 11, the apparatus includes first generating code 1101, second generating code 1102, fusion code configured 1103, third generating code 1104, predicting code 1105, residual code 1106, and fourth generating code 1107.

The first generating code 1101 is configured to cause the at least one processor to generate intermediate flows based on input frames.

The second generating code 1102 is configured to cause the at least one processor to perform backward warping of the input frames with the intermediate flows to generate reconstruction frames.

The fusion code configured 1103 is configured to cause the at least one processor to generate a fusion map and a residual map, based on the input frames, the intermediate flows, and the reconstruction frames.

The third generating code 1104 is configured to cause the at least one processor to generate a feature map with a plurality of levels using a first neural network, based on a current reference frame, a first reference frame, and a second reference frame.

The predicting code 1105 is configured to cause the at least one processor to predict a frame based on aligned features from the generated feature map by refining the current reference frame, the first reference frame, and the second reference frame.

The residual code 1106 is configured to cause the at least one processor to generate a final residual based on the predicted frame.

The fourth generating code 1107 is configured to cause the at least one processor to generate an enhanced frame as an output by adding the final residual to the current reference frame.

Although FIG. 11 shows example blocks of the apparatus, in some implementations, the apparatus may include additional blocks, fewer blocks, different blocks, or differently arranged blocks than those depicted in FIG. 11. Additionally, or alternatively, two or more of the blocks of the apparatus may be combined.

The apparatus may further include updating code configured to cause the at least one processor to iteratively update the intermediate flows and move corresponding pixels from two input frames to the same location in a latent intermediate frame, reference frame code configured to cause the at least one processor to generate the current reference frame by linearly combining the reconstruction frames according to the fusion map and adding the combined reconstruction frames with the residual map, determining code configured to cause the at least one processor to determine a weight of the feature map, wherein the weight emphasizes important features for generating subsequent final residuals, computing code configured to cause the at least one processor to compute an offset for the plurality of levels, compensation feature generating code configured to cause the at least one processor to perform deformable convolution to generate compensation features for the plurality of levels, aligned feature generating code configured to cause the at least one processor to generate the aligned features based on the offset and at least one of the generated compensation features, performing code configured to cause the at least one processor to perform convolution to obtain attention maps, attention feature generating code configured to cause the at least one processor to generate attention features based on the attention maps and the aligned features, aligned frame generating code configured to cause the at least one processor to generate an aligned frame, based on the attention maps and the attention features, using a second neural network, and synthesizing code configured to cause the at least one processor to synthesize the aligned frame to obtain the predicted frame.

Comparing with traditional inter-frame generation approaches, the proposed method performs DNN-based network in video coding. Instead of computing an explicit motion vector or motion flow that either cannot handle complex motion or is prone to error, the proposed methods directly take data from a Reference Picture List (RPL) to generate a virtual reference frame. And then the enhanced Deformable Convolution (DCN) is applied to capture the offset of pixels and implicitly compensate large complex motion for further detailed enhancement. Finally, a high-quality enhanced frame is reconstructed by a DNN model.

The proposed methods may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of video coding using neural network based inter-frame prediction, the method being performed by at least one processor, and the method comprising:
    generating intermediate flows based on input frames;
    generating reconstruction frames by performing backward warping of the input frames with the intermediate flows;
    generating a fusion map and a residual map, based on the input frames, the intermediate flows, and the reconstruction frames;
    generating a feature map with a plurality of levels using a first neural network, based on a current reference frame, a first reference frame, and a second reference frame;
    generating a predicted frame based on aligned features from the generated feature map by refining the current reference frame, the first reference frame, and the second reference frame;
    generating a final residual based on the predicted frame; and
    computing an enhanced frame as an output by adding the final residual to the current reference frame.

2. The method of claim 1, wherein the intermediate flows are iteratively updated and corresponding pixels are moved from two input frames to the same location in a latent intermediate frame.

3. The method of claim 1, further comprising generating the current reference frame by linearly combining the reconstruction frames according to the fusion map and adding the combined reconstruction frames with the residual map.

4. The method of claim 1, wherein the first reference frame is a reference frame that precedes the current reference frame in an output order and the second reference frame is a reference frame that follows the current reference frame in the output order.

5. The method of claim 1, further comprising determining a weight of features in the feature map, wherein the weight emphasizes a subset of features for generation of subsequent final residuals.

6. The method of claim 1, further comprising:
    computing an offset for the plurality of levels;
    performing deformable convolution to generate compensation features for the plurality of levels; and
    generating the aligned features based on the offset and at least one of the generated compensation features.

7. The method of claim 1, further comprising:
    performing convolution to obtain fused attention maps;
    generating attention features based on the attention maps and the aligned features;
    generating an aligned frame, based on the attention maps and the attention features, using a second neural network; and
    synthesizing the aligned frame to obtain the predicted frame.

8. An apparatus for video coding using neural network based inter-frame prediction, the apparatus comprising:
    at least one memory configured to store program code; and
    at least one processor configured to read the program code and operate as instructed by the program code, the program code comprising:
        first generating code configured to cause the at least one processor to generate intermediate flows based on input frames;
        second generating code configured to cause the at least one processor to perform backward warping of the input frames with the intermediate flows to generate reconstruction frames;
        fusion code configured to cause the at least one processor to generate a fusion map and a residual map, based on the input frames, the intermediate flows, and the reconstruction frames;
        third generating code configured to cause the at least one processor to generate a feature map with a plurality of levels using a first neural network, based on a current reference frame, a first reference frame, and a second reference frame;
        predicting code configured to cause the at least one processor to predict a frame based on aligned features from the generated feature map by refining the current reference frame, the first reference frame, and the second reference frame;
        residual code configured to cause the at least one processor to generate a final residual based on the predicted frame; and
        fourth generating code configured to cause the at least one processor to generate an enhanced frame as an output by adding the final residual to the current reference frame.

9. The apparatus of claim 8, further comprising updating code configured to cause the at least one processor to iteratively update the intermediate flows and move corresponding pixels from two input frames to the same location in a latent intermediate frame.

10. The apparatus of claim 8, further comprising reference frame code configured to cause the at least one processor to generate the current reference frame by linearly combining the reconstruction frames according to the fusion map and adding the combined reconstruction frames with the residual map.

11. The apparatus of claim 8, wherein the first reference frame is a reference frame that precedes the current reference frame in an output order and the second reference frame is a reference frame that follows the current reference frame in the output order.

12. The apparatus of claim 8, further comprising determining code configured to cause the at least one processor to determine a weight of features in the feature map, wherein the weight emphasizes a subset of features for generating subsequent final residuals.

13. The apparatus of claim 8, further comprising:
computing code configured to cause the at least one processor to compute an offset for the plurality of levels;
compensation feature generating code configured to cause the at least one processor to perform deformable convolution to generate compensation features for the plurality of levels; and
aligned feature generating code configured to cause the at least one processor to generate the aligned features based on the offset and at least one of the generated compensation features.

14. The apparatus of claim 8, further comprising:
performing code configured to cause the at least one processor to perform convolution to obtain fused attention maps;
attention feature generating code configured to cause the at least one processor to generate attention features based on the attention maps and the aligned features;
aligned frame generating code configured to cause the at least one processor to generate an aligned frame, based on the attention maps and the attention features, using a second neural network; and
synthesizing code configured to cause the at least one processor to synthesize the aligned frame to obtain the predicted frame.

15. A non-transitory computer-readable medium storing instructions that, when executed by at least one processor for video coding using neural network based inter-frame prediction, cause the at least one processor to:
generate intermediate flows based on input frames;
perform backward warping of the input frames with the intermediate flows to generate reconstruction frames;
generate a fusion map and a residual map, based on the input frames, the intermediate flows, and the reconstruction frames;
generate a feature map with a plurality of levels using a first neural network, based on a current reference frame, a first reference frame, and a second reference frame;
predict a frame based on aligned features from the generated feature map by refining the current reference frame, the first reference frame, and the second reference frame;
generate a final residual based on the predicted frame; and
generate an enhanced frame as an output by adding the final residual to the current reference frame.

16. The non-transitory computer-readable medium of claim 15, wherein the instructions, when executed by the at least one processor, further cause the at least one processor to update the intermediate flows and move corresponding pixels from two input frames to the same location in a latent intermediate frame.

17. The non-transitory computer-readable medium of claim 15, wherein the instructions, when executed by the at least one processor, further cause the at least one processor to generate the current reference frame by linearly combining the reconstruction frames according to the fusion map and adding the combined reconstruction frames with the residual map, and
wherein the first reference frame is a reference frame that precedes the current reference frame in an output order and the second reference frame is a reference frame that follows the current reference frame in the output order.

18. The non-transitory computer-readable medium of claim 15, wherein the instructions, when executed by the at least one processor, further cause the at least one processor to determine a weight of features in the feature map, wherein the weight emphasizes a subset of features for generating subsequent final residuals.

19. The non-transitory computer-readable medium of claim 15, wherein the instructions, when executed by the at least one processor, further cause the at least one processor to:
compute an offset for the plurality of levels;
perform deformable convolution to generate compensation features for the plurality of levels; and
generate the aligned features based on the offset and at least one of the generated compensation features.

20. The non-transitory computer-readable medium of claim 15, wherein the instructions, when executed by the at least one processor, further cause the at least one processor to:
perform convolution to obtain fused attention maps;
generate attention features based on the attention maps and the aligned features;
generate an aligned frame, based on the attention maps and the attention features, using a second neural network; and
synthesize the aligned frame to obtain the predicted frame.

* * * * *